(No Model.)
R. E. LINDNER & J. H. F. ZIEGENBEIN.
APPARATUS FOR WITHDRAWING LIQUIDS FROM VESSELS.
No. 597,292. Patented Jan. 11, 1898.
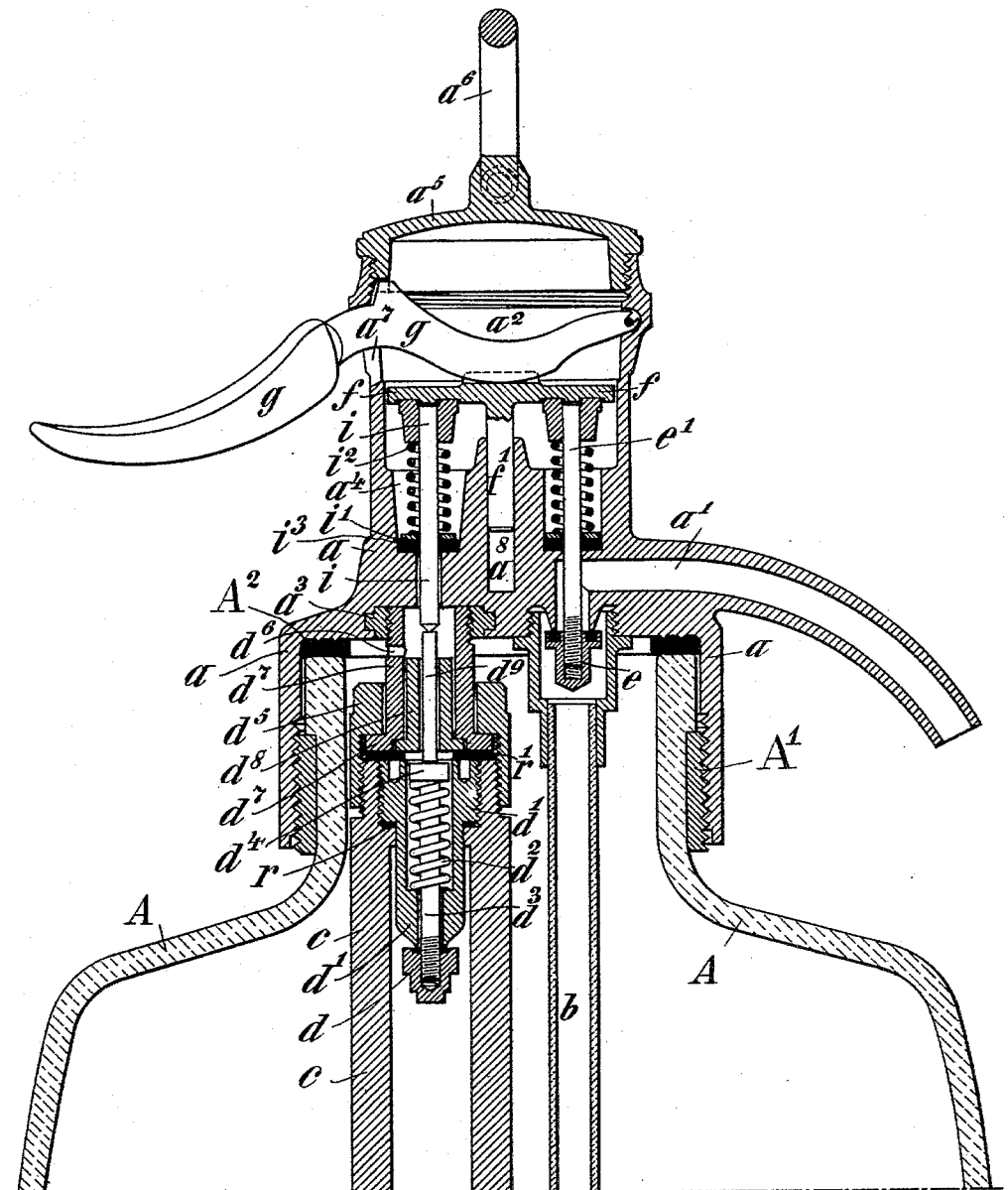
Witnesses:
B. S. Ober.
B. H. Sommers
Inventors:
Richard Eduard Lindner
Johann Heinrich Franz Ziegenbein
By Henry Orth
Attorney.

UNITED STATES PATENT OFFICE.

RICHARD EDUARD LINDNER, OF HAMBURG, AND JOHANN HEINRICH FRANZ ZIEGENBEIN, OF ALTONA, GERMANY.

APPARATUS FOR WITHDRAWING LIQUIDS FROM VESSELS.

SPECIFICATION forming part of Letters Patent No. 597,292, dated January 11, 1898.

Application filed July 16, 1897. Serial No. 644,836. (No model.)

*To all whom it may concern:*

Be it known that we, RICHARD EDUARD LINDNER, a subject of the Grand Duke of Weimar, and a resident of Hamburg, and JOHANN HEINRICH FRANZ ZIEGENBEIN, a subject of the King of Prussia, Emperor of Germany, and a resident of Altona-Ottensen, in the Province of Schleswig-Holstein, Germany, have invented certain new and useful Improvements in Apparatus for Withdrawing Liquids from Vessels, Bottles, and the Like, of which the following is a specification.

The subject of this invention is an apparatus for withdrawing liquids either free from carbonic acid or containing such acid, but in a slight proportion, especially beer, from a bottle, jar, or other vessel, such apparatus being formed by properly forming the cover or lid employed in closing the said vessel and containing all the parts and arrangements required for the supply or service of liquor on draft.

The difficulty which did not allow such apparatus commonly known and applied as "beer-siphons" or "siphon vessels" to get in vogue is involved by the complicated and expensive construction of such apparatus and not in the least by the troublesome handling or management of the same. The object of the invention is to obviate such inconveniences and to procure a beer-siphon apparatus in which the several parts are arranged in such a manner that reduction-valves and separate valves or cocks for regulating the supply of the carbonic acid may be dispensed with, and that the lever operating the stop-valve of the outlet pipe or nozzle opens at the same time, by its being depressed, the stop-valve of the carbonic-acid reservoir. After, therefore, the said siphon apparatus and closing-head or lid has been fitted air-tight onto the vessel containing the beer it is only necessary, when it is desired to pour out or discharge some of the beer, to depress or displace the single pressure-lever and to release it again as soon as the desired quantity of beer has been discharged or the glass filled up, respectively. A separate operation for closing the outlet-tube is not necessary, as the stop-valve for the outlet acts automatically and is closed simultaneously with the stop-valve of the carbonic-acid reservoir. The drawing off of the beer is therefore effected in the simplest manner, exactly so as in the siphon-bottles for aerated waters known throughout the world.

The above-stated object is attained by the means illustrated in the accompanying drawing, showing a vertical sectional elevation of a beer-siphon jar made in accordance with the present invention.

The siphon apparatus $a$, forming at the same time the lid of the beer-jar A, is screwed down on a threaded ring $A'$, fixed upon the neck of the jar. A suitable packing-ring $A^2$, placed between the rim of the jar and the lid $a$, secures an air-tight closing of the jar. The cover or lid $a$ is provided with a discharge pipe or nozzle $a'$, communicating with the elevator-tube $b$, attached to the head-like cover $a$. Fixed to the cover $a$ is also a carbonic-acid reservoir or receiver $c$. The latter and the elevator-tube $b$ reach into the interior of the jar and dip into the beer contained therein. In a suitable recess $a^2$ of the closing head or lid $a$ is supported a pusher-rod $i$, controlled by a spring $i^2$ and adapted to act by means of a loosely-inserted stem $d^9$ upon the spring-controlled stop-valve $d$ of the carbonic-acid receiver $c$. The pusher-rod $i$, constructed in the shape of a safety-valve, as will be described later on, is connected with the valve-rod $e'$ of the spring-controlled cut-off valve $e$ of the outlet-bore $a'$ by means of a disk-like traverse $f$, movably fitting into the said recess $a^3$. The traverse $f$ is guided by a rod or bar $f$, sliding in a bore $a^8$ of the cover $a$. In the recess $a^2$ is also arranged the operating or pressing lever $g$, which is adapted to act upon the traverse $f$, as this will be readily understood from the drawing. The recess $a^2$ is closed at the upper end by a screw-cap $a^5$, provided with a handle or ring $a^6$.

The valve which closes the carbonic-acid receiver $c$ preferably consists of an annular valve-seat $d'$, screwed into the orifice of the receiver $c$, against the sharp edge of which the valve $d$ proper is pressed by a spring $d^2$. This spring rests upon a valve-rod $d^3$, one end of it taking up its position in contact with the valve-seat $d'$, while its other end meets a collar or head $d^4$ on the valve-rod $d^3$. Upon the end surface of the receiver $c$ a flanged tube or sleeve $d^7$, provided with a lateral outlet $d^6$, is secured by means of a nut $d^5$. By the aid of the sleeve $d^7$ the carbonic-acid receiver $c$ is screwed into the closing-head $a$, or rather into a nut $a^3$, fitted or embedded in such head. In the central perforation of the tube or sleeve $d^7$ or its lining $d^8$ a rod or stem $d^9$ is loosely inserted, which serves to transmit the downward motion of the spring-controlled pusher-rod $i$ to the valve-rod $d^3$, or, in other words, to the valve $d$ of the receiver $c$. The said valve-rod $d^3$ and the rod or stem $d^9$ are inserted in their respective guides with sufficient play to enable the carbonic acid to reach the outlet-orifice $d^6$ unimpeded and through it to find its way into the jar or vessel A.

Between the valve-seat $d'$, receiver $c$, and sleeve $d^7$ suitable packing-rings $r$ and $r'$ are interposed.

Should there be too much pressure—i. e., a pressure exceeding a predetermined limit—within the vessel A, containing the liquid, the carbonic-acid gas will raise a valve-disk $i'$, loosely mounted on the pusher-rod $i$, and in so doing overcome the resistance or pressure of the spring $i^2$, controlling the pushing-rod, so that the carbonic acid in excess may escape between the edge of the slightly-lifted plate $i'$ or its packing-ring $i^3$ and the wall of a recess $a^4$, surrounding the rod, which recess is slightly conical—that is, widened or enlarged in the upward direction. Thence the gas passes through the opening or slot $a^7$, provided for the lever $g$, and passes off into the atmosphere. When the pressure in the jar or vessel is once sufficiently reduced, the spring $i^2$ will once more tightly press the valve-disk $i'$ $i^3$ against the bottom opening of the recess $a^4$, thereby effecting a reliable seal. The above-described automatic regulation of the pressure inside the jar A is effected in that the valve-plate $i'$ $i^3$ is movable on the rod $i$, and the spring $i^2$ is adapted to act upon the valve-plate with a predetermined resistance corresponding to the allowed maximum pressure in the jar. As the pusher-rod $i$ is not rigidly connected with the stop-valve $d$ or its rods $d^3$ $d^9$, respectively, the receiver $c$ may be easily removed or replaced by another without dismounting the siphon apparatus. Finally, cleaning and filling of the jar A can be effected in the easiest possible manner after the whole device or apparatus has been unscrewed from the jar-neck of the ring A', respectively.

Having fully described our invention, what we claim, and desire to secure by Letters Patent, is—

1. For dispensing liquids, a vessel provided with a discharge-spout in communication with the vessel near its bottom, a spring-seated dispensing-valve in said communication, a chamber for the storage of a forcing fluid contained in the vessel and in communication with the upper part thereof and with the atmosphere, a spring-seated valve in the communication between said chamber and vessel, and a like safety-valve in the communication of said chamber with the atmosphere, and means for simultaneously unseating the dispensing and forcing-fluid-controlling valves, for the purpose set forth.

2. For dispensing liquids, a vessel provided with a discharge-spout in communication with the vessel near its bottom, a spring-seated valve in said communication, a chamber for the storage of a forcing fluid contained in the vessel and in communication with the upper part thereof, a spring-seated valve in said communication, a traverse connected with the stems of said valves, and a lever acting on said traverse to depress the valve-stems and unseat the valves against the stress of their springs, substantially as and for the purpose set forth.

3. For dispensing liquids, the combination with a vessel, a cap therefor provided with a discharge-spout in communication with said vessel near its bottom, a spring-seated dispensing-valve in said communication, a chamber for the storage of a forcing fluid, a tubular plug connected with the cap and extending into said chamber, a spring-seated valve closing the inner end of said plug, the stem of said valve extending through said plug, the latter in communication with the upper part of the vessel and with the atmosphere, a spring-seated safety-valve in the last-named communication, and a push-rod extending through said valve and abutting against the stem of the plug-valve, of a traverse movable in the cap and connected with said push-rod and with the stem of the dispensing-valve, and means for depressing the traverse, for the purpose set forth.

4. For dispensing liquids, the combination with a vessel, a cap therefor provided with a discharge-spout in communication with said vessel near its bottom, a spring-seated dispensing-valve in said communication, a chamber for the storage of a forcing fluid, a tubular plug connected with the cap and extending into said chamber, a spring-seated valve closing the inner end of said plug, the stem of said valve extending through said plug, the latter in communication with the upper part of the vessel and with the atmosphere, a spring-seated safety-valve in the last-named communication, and a push-rod extending through said valve and abutting against the stem of said plug-valve, of a traverse movable in the cap and connected with said push-rod and with the stem of the dispensing-valve, and a bent lever fulcrumed in the cap and projecting therefrom, the bent portion of said lever in contact with the traverse, substantially as and for the purpose set forth.

5. The combination with the cap, $a$, provided with a discharge-spout, a siphon-pipe in communication with said spout, a valve interposed between said spout and pipe said valve provided with a stem extending into a chamber in the upper part of the cap, a traverse movable vertically in said chamber to which traverse said valve-stem is connected, and the bent lever $g$ fulcrumed in the cap-chamber and impinging upon the traverse, of a reservoir for a forcing fluid detachably connected with the cap, said reservoir provided near its upper end with a lateral fluid-discharge port and with an internal valve-seat, a valve, a spring holding the same to its seat said valve provided with a stem extending into the cap-chamber and connected with the aforesaid traverse, for the purpose set forth.

6. The combination with the cap, $a$, provided with a discharge-spout, a siphon-pipe in communication with the spout, a valve interposed between said spout and pipe, said valve provided with a stem extending into a chamber in the upper part of the cap, a traverse movable vertically in said chamber to which traverse said valve-stem is connected, and the bent lever $g$ fulcrumed in the cap-chamber and impinging upon the traverse, of a reservoir for a forcing fluid detachably connected with the cap, said reservoir provided near its upper end with a lateral fluid-discharge port and with an internal valve-seat, a valve, a spring holding the same to its seat said valve provided with a stem extending into the outlet end of the reservoir, a fluid-escape passage leading from said outlet end into the cap, a safety-valve for said passage, a push-rod connected with the aforesaid traverse, said rod extending through said safety-valve passage and impinging upon the stem of the reservoir-valve, and a spring interposed between the safety-valve and the traverse to hold said valve to its seat, substantially as and for the purpose set forth.

In testimony that we claim the foregoing as our invention we have signed our names, in presence of two witnesses, this 2d day of July, 1897.

RICHARD EDUARD LINDNER.
JOHANN HEINRICH FRANZ ZIEGENBEIN.

Witnesses:
ALEXANDER SAECHT,
HERMANN NAGEL.